United States Patent
Babbage et al.

(10) Patent No.: US 9,425,844 B2
(45) Date of Patent: Aug. 23, 2016

(54) SIM LOCKING

(75) Inventors: Stephen Babbage, Newbury (GB); Nicholas Bone, Thatcham (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

(21) Appl. No.: 13/996,219

(22) PCT Filed: Dec. 22, 2011

(86) PCT No.: PCT/GB2011/052575
§ 371 (c)(1),
(2), (4) Date: Dec. 5, 2013

(87) PCT Pub. No.: WO2012/085593
PCT Pub. Date: Jun. 28, 2012

(65) Prior Publication Data
US 2014/0087790 A1    Mar. 27, 2014

(30) Foreign Application Priority Data

Dec. 22, 2010 (GB) .................................. 1021784.2

(51) Int. Cl.
*H04B 1/3816* (2015.01)
*H04W 8/18* (2009.01)
*H04W 12/08* (2009.01)

(52) U.S. Cl.
CPC .............. *H04B 1/3816* (2013.01); *H04W 8/183* (2013.01); *H04W 12/08* (2013.01)

(58) Field of Classification Search
CPC .... H04B 1/3816; H04W 8/183; H04W 12/08; H04W 12/00; H04W 8/18
USPC ......................................... 455/407, 557, 558
See application file for complete search history.

(56) References Cited

U.S. PATENT DOCUMENTS

| | | | |
|---|---|---|---|
| 2004/0005911 A1* | 1/2004 | Guirauton et al. ............ | 455/558 |
| 2006/0107037 A1* | 5/2006 | Lincoln et al. ................ | 713/155 |
| 2007/0049269 A1* | 3/2007 | Ophir et al. ................ | 455/432.1 |
| 2007/0178885 A1* | 8/2007 | Lev ........................ | H04L 63/083 |
| | | | 455/411 |
| 2009/0270126 A1* | 10/2009 | Liu ............................... | 455/558 |
| 2009/0307139 A1* | 12/2009 | Mardikar et al. .............. | 705/67 |
| 2010/0092160 A1* | 4/2010 | Bhogal et al. ................. | 386/124 |
| 2011/0193718 A1* | 8/2011 | Chevrette et al. ........ | 340/870.02 |
| 2013/0227137 A1* | 8/2013 | Damola et al. ................ | 709/224 |

OTHER PUBLICATIONS

Walker, Michael, Embedded SIMs and M2M Communications, Jan. 20, 2011 XP002673376, Retrieved from the Internet: URL:http://docbox.etsi.org/workshop/2011/201101securityworkshop/s4 mobiile wireless security/walker embeddedims.pdf [retrieved on Apr. 2, 2012] p. 4-p. 8.
PCT/GB2011/052575, mailed Apr. 18, 2012, International Search Report.

* cited by examiner

*Primary Examiner* — Dinh P Nguyen
(74) *Attorney, Agent, or Firm* — Workman Nydegger

(57) ABSTRACT

Where a smartcard is embedded or inaccessible within a cellular telecommunications device (i.e. an eUICC), locking the smartcard (or the subscription associated with the smartcard) to a particular MNO while allowing the MNO to be altered legitimately presents a challenge. A method is described using policy control tables stored in a trusted service manager registry and/or the smartcard's data store. By maintaining the policy control table, any MNO subscription may be downloaded/activated on the smartcard but the device will be prevented from accessing the desired MNO because that access would violate the lock rules.

20 Claims, 2 Drawing Sheets

SIM LOCKING

CROSS REFERENCE TO RELATED APPLICATIONS

This application is a U.S. Nationalization of International Application Number PCT/GB2011/052575, filed on Dec. 22, 2011, which claims priority to United Kingdom Patent Application No. 1021784.2, filed on Dec. 22, 2010, the entireties of which are incorporated herein by reference.

FIELD OF THE INVENTION

The invention relates to the field of smartcards for authenticating terminal equipment with the wireless telecommunications networks, such as GSM or UMTS networks, or mobile network operators (MNOs).

BACKGROUND TO THE INVENTION

Today mobile network operators (MNOs) require SIM Locks by the device manufacturers to protect the use of subsidized mobile devices with other than intended SIMs (based on MCC/MNC, SP, etc.). The goal is to prevent the user from using the device with another SIM (in general the SIM of another MNO). One such approach to SIM locking is described in the Applicant's patent, GB2287855.

Conventional SIM Lock is implemented by mechanisms on the device which check based on the IMSI and GID if a SIM is allowed to be used in this device. These SIM Lock mechanisms are often compromised.

SIM cards (also referred to as Universal Integrated Circuit Cards, UICCs) are a ubiquitous form of smart card. Wireless telecommunications network standards mandate that authentication of networked devices is facilitated though SIM cards (in fact the term SIM card is often used collectively to encompass true SIM cards and USIM cards). These cards securely store essential components of the network authentication procedure: secret keys (including the network authentication key (Ki)), "over the air" (OTA) transport keys and parameters for one or more operator encryption algorithms.

Each SIM card is specific to the customer and, in addition to authentication information, carries information particular to that customer such as the customer's International Mobile Subscriber Identifier (IMSI).

SIM cards are used to provide the relevant identification (e.g. IMSI) and authentication information for each terminal. In certain applications, for instance telematics applications, the SIM may not be provided on a card per se but on an integrated circuit implanted or integrated into the device. This may, for example, take the form of a VQFN8 package for standardised installation.

Existing SIM cards are typically personalized for a single MNO: in other words, they store secret keys that are only valid on the network of one MNO. Each SIM will thus be specific to a particular network (the "home" network)—that is, it will have been issued under the control of the operator of that network and will be for use within that network.

Changing MNO requires the physical exchange of removable SIM cards. This exchange of card is impracticable some cases—the terminals where SIMs need to be swapped may be widely distributed or embedded (and consequently unswappable).

The GlobalPlatform Card specification V2.2 (published in March 2006) describes techniques for remote application management (RAM) of UICCs via OTA, including dynamic addition & modification of applications. RAM is also described in ETSI TS 101 226. This specification is based on the paradigm that there is one single Card Issuer for any given UICC card and offers to the Card Issuer the flexibility for managing an ever-changing array of service providers who may want to run applications on the Card Issuer's cards.

To facilitate the secure management and provisioning of the applications issued by service providers and the MNO, GlobalPlatform describes a standardised entity known as a Trusted Service Manager (TSM). Provisioning is typically performed over the air (OTA) and includes the download and installation of the applications onto the UICC/SIM. The TSM is essentially a network component functionality that brokers connections with MNOs, phone manufacturers or other entities controlling the UICC. To act as broker, a TSM must be "trusted" by the MNO (at least) and is required to include facilities for storing tables of data policy information, such as the rules around device and UICC card locking. In some cases an MNO itself may be considered a special case of a TSM.

Further secure elements are provided on the UICC itself: Security Domains (SD) are defined as on-card entities providing support for the control, security, and communication requirements of the Application Provider: they are used for the management of Service Provider applications on a SIM card. An Issuer Security Domain (ISD) is defined to provide support for requirements of the Card Issuer—e.g. the MNO.

Depending upon circumstances, SDs are arranged in a number of different hierarchies. In one hierarchy, a dedicated Security Domain is provided for TSM usage—a so-called TSD, or "Trusted Service Manager Security Domain". The TSD is associated with an Issuer Security Domain (ISD), which in turn is managed by the MNO, as issuer of the SIM, Security Domains of Service Providers may be associated directly to the Issuer Security Domain (ISD).

In addition to the functions of a security domain, the ISD supports secure communications for card content management and for applications and manages data stored in registers on the UICC.

A facility for enabling an MNO or Trusted Service Manager (TSM) to trigger a smart card to derive appropriate secret keys for operating with that network and thereby "defining" a smartcard as a card for use with a given MNO is described in copending patent application (GB 1021300.7).

In a conventional telecommunications system, the secret key Ki is paired with the International Mobile Subscriber Identity (IMSI) of the SIM at the point of manufacture. Only the IMSI and hence its intrinsically coupled Ki, dictates to which network a device can connect natively. It is not presently feasible for a SIM to connect natively to, or inherit the footprint of, a variety of networks because the Ki, as mentioned above, is not transmittable, transferable or programmable. Furthermore, there are often strong commercial reasons for the MNO associated with the Ki to wish that the SIM—once thus "provisioned"—continue to be used with that same network.

Clearly, enforcing a SIM-lock or subscription lock feature in cases where smartcards may be embedded/impractical to access and a change of subscription is required presents a number of challenges. Further complications ensue when smartcards are permitted to carry multiple subscriptions.

SUMMARY OF THE INVENTION

In accordance with an aspect of the invention there is provided a method for personalisation of a mobile equipment, the mobile equipment having a physically unswappable smart card, wherein a telecommunications subscription available on the smart card is updateable, the method comprising:

receiving a request to swap the telecommunications subscription logically, replacing the telecommunications subscription with a second telecommunications subscription;

accessing a personalisation rule table record corresponding to the smart card; and provided the personalisation rule table record does not indicate the requested swap is forbidden, facilitating a logical swap to the second telecommunications subscription.

There may be a plurality of subscriptions available for installation to the card or activated on the card.

Personalisation rules—including without exhaustion network lock, and lock to a specific IMSI as described in ETSI TS 122 022: "Personalisation of Mobile Equipment (ME)"—are conveniently implemented within the said smart card or secure element. The personalisation rules are preferably updateable by the operator with the currently active subscription (the active operator) or by any Trusted Services Manager (TSM) that is trusted by that operator, such that the said smart card or secure element refuses to activate any telecommunications subscription that violates the personalisation rules, and optionally blocks the installation of such a telecommunications subscription where it is not already loaded.

The TSM preferably establishes the initial personalisation rules on behalf of the active operator, but then provides the active operator with the means to further personalise or de-personalise the device independently of the TSM.

The TSM may further provide a form of unlock code to the active operator to further personalise or depersonalise the device, a code which the operator can then provide to the device or to the user of the device.

Alternatively, the TSM may authorize a keyset of the active operator to perform further personalisation or depersonalisation of the device.

Conveniently, the device may be "locked" to a unique currently active subscription, and the relevant subscription is then barred by the active operator, so making the device unusable with any telecommunications subscription.

Such locking and barring may be used as an anti-theft measure.

Advantageously, a device is pro-actively "locked" to a unique currently active subscription or to the subscription range of the current active operator prior to any reported theft.

The locking or barring (or both) may be made temporary while the status of a reported theft is investigated.

Preferably, the device may be locked to its current active subscription by marking that subscription on the smart card or secure element as "do not deactivate/do not delete".

The personalisation, de-personalisation or locking instructions are conveniently delivered to the device Over The Air.

The method advantageously further includes a mechanism for switching on the device itself between "active" and "dormant" subscriptions, and this change mechanism is constrained by the personalisation rules on the embedded smart card or secure element.

Any change of subscription is preferably only temporary until it is successfully reported to, and explicitly confirmed by, a server managed by the active operator or Trusted Services Manager, with the change being reverted on the smart card or secure element in case of failure to confirm.

BRIEF DESCRIPTION OF THE DRAWINGS

For a better understanding of the present invention, reference will now be made, by way of example only, to the accompanying drawings in which.

DETAILED DESCRIPTION

Figure 1:
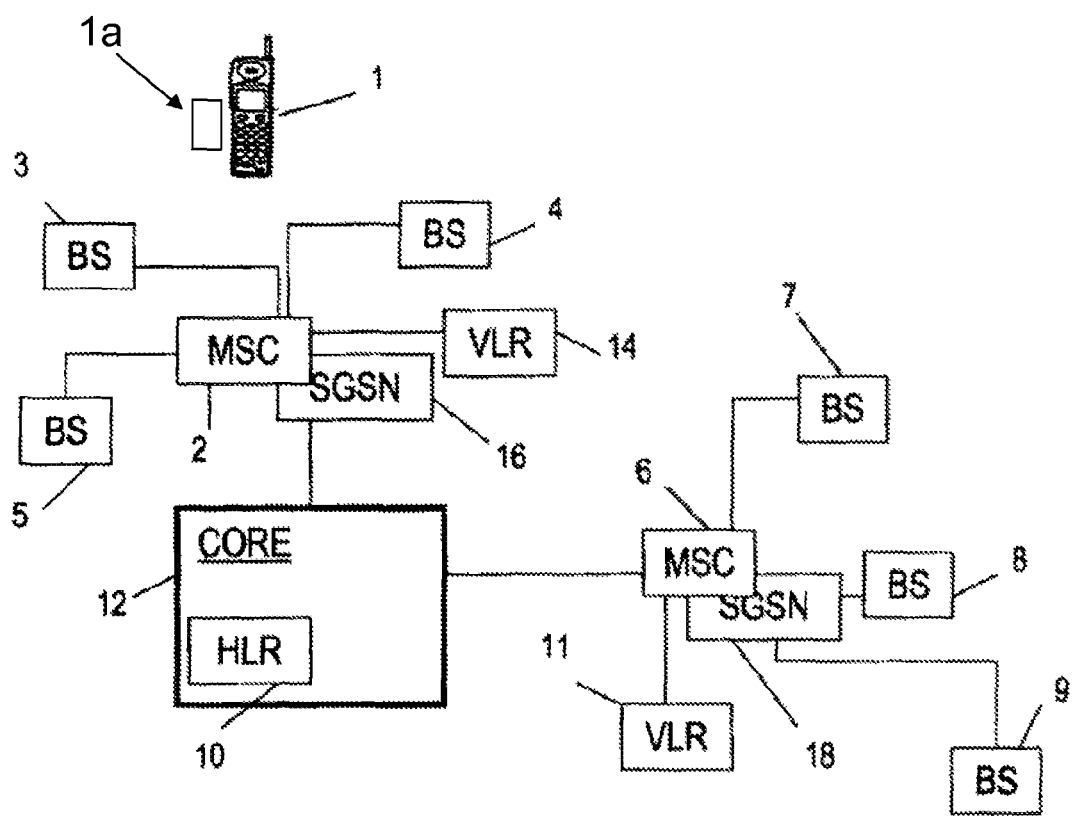
FIG. 1 illustrates key elements of a mobile/cellular telecommunications system and FIG. 2 illustrates a key derivation mechanism in accordance with U.S. Pat No. 9,247,429.
Figure 2:
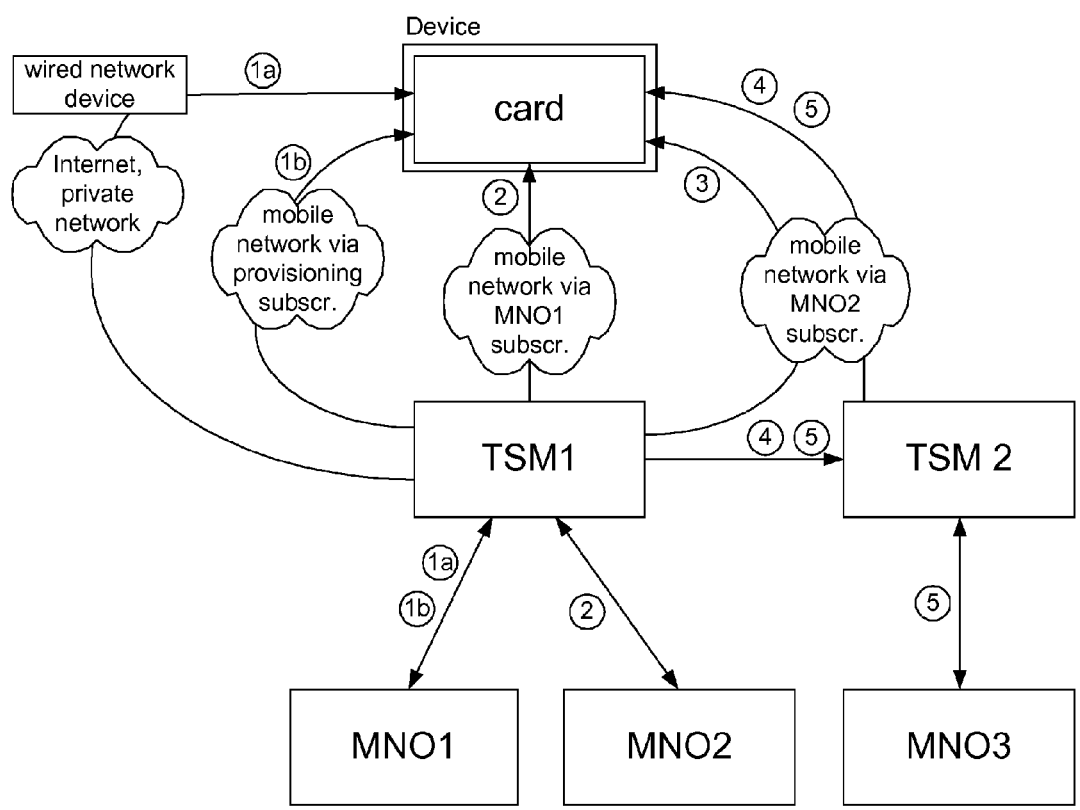

The present invention deals with "personalisation" rules—including without exhaustion network lock, and lock to a specific IMSI. The term personalisation is a term of art including various mechanisms for locking a SIM (or device) to a network, device type, and/or subscription. Conventional personalised rules are described in ETSI TS 122 022: "Personalisation of Mobile Equipment (ME)".

While the invention is described below in terms of "SIM lock" rules, it applies equally and with no further inventive input to other types of related personalisation (or "policy") rules. Examples of other such personalisation/policy rules include MNO policies such as:

Whether other subscriptions are even allowed to exist on the eUICC in a dormant state, or active state, or both.

Whether device is allowed to switch between dormant and active subscriptions itself, or whether this can only be done under TSM control.

Whether there is a "fallback" subscription that the eUICC switches back to if there is no network coverage under the existing active subscription.

Whether the device has to reboot after change of subscription.

Whether it needs to use a special secure channel or special boot state to allow change of subscription/request removal of locks etc. (This ensures it is under explicit user control, or control of trusted software, not just available to any requesting application)

To enforce a SIM Lock (i.e. a subscription lock) and yet allow subscription change in the cases where the smartcard may be embedded or impractical to access, three approaches are considered:

1. Conventionally, the SIM-lock is implemented on the device independently of the smartcard. This means that any MNO subscription could be downloaded to/made active on the smartcard, but it might not work, as the device might reject it.

2. The SIM-lock (or rather subscription lock) is implemented by a TSM's management database (essentially a large policy control table). Technically, any MNO subscription can be downloaded to/activated on the smartcard (and it will work), but the TSM will keep track of which devices are locked to which MNOs, so it doesn't download/activate anything which violates the lock rules.

3. The SIM-lock (or rather subscription lock) is implemented on the smartcard. The smartcard will refuse to install an MNO subscription that violates the lock-rules, and/or refuse to activate any such subscription.

A SIM Lock implemented on the device (solution 1) would only make sense if a TSM performed an unauthorized change of subscription. Where the TSM has to be trusted by MNOs this approach is of little value.

In fact, solutions 2 and 3 have a similar trust model: they both require trust in the TSM. The smartcard implicitly implements a SIM Lock since only the TSM (and not the user) is able to install a new subscription. Under the assumption that the TSM is trusted by the MNO, from the trust point of view there is no need to implement a SIM Lock locally to the smartcard. However the TSM must manage the SIM Locks in its backend systems. Therefore it may make sense to store SIM Lock information on the smartcard to make the management easier. This information is conveniently stored in the Issuer Security Domain (ISD).

Another related use case could be to prevent the deletion/deactivation of a subscription (e.g. by accident). The related information (a given subscription must not be deleted/deactivated) could either be stored in the ISD or in subscription domain.

A further use case is prevention of device theft. In case of theft, the smartcard could be locked to its currently active IMSI (e.g. by marking that subscription as "do not deactivate/do not delete") and then the relevant MNO bars its IMSI. The device is now unusable with any subscription. In case of a false theft report (device was lost, and is found again) the MNO unbars the IMSI.

It seems clear that solution 1) is not the best solution for embedded smartcards, as it violates the trust model assumptions, has weaker security (SIM-locks will be broken on devices using conventional attacks) and could cause general annoyance and waste of time/effort by TSMs. However, it might be needed in the short term for time to market reasons, or because an MNO's systems will require a long time to adapt from an existing SIM-lock mechanisms to a new mechanism.

As solutions 2) and 3) have a similar trust model, and solution 3) requires more logic on the embedded smartcard there is a "simplicity" argument for solution 2).

However, with solution 3), while the TSM will need to set up lock rules (in the ISD) on behalf of the active MNO, the TSM does not need to keep track of those rules. For instance, the TSM could give the MNO an "unlock code" (or authorize the MNO's OTA keyset to perform unlocking), in which case the TSM does not have to bother at all about the conditions for unlocking (whether based on length of contract, payment by the subscriber or whatever). This approach would also provide a migration path from current SIM-lock solutions.

Solution 2 would require the TSM to have a persistent register of stolen devices, so that further MNO subscriptions cannot be loaded to the relevant smartcards. Solution 3 may make this rather easier: the smartcard is just locked to its current active IMSI, and that IMSI is barred. Potentially the active MNO can do this independently of the TSM. There could be a simple OTA command to lock to current active IMSI (by preventing its deletion or deactivation), and the OTA keys of the currently active MNO are authorized to send it.

A final consideration is multiple TSMs. If TSM1 hands over to TSM2, and Solution 2 is used, then TSM1 also needs to inform TSM2 of the locking rules in place. So the policy control table has (in some way) to be shared between TSMs. With Solution 3, the lock table is local to the smartcard and is handed over automatically. The new TSM (TSM2) can read it, if necessary, or just implement a simple rule that it will not update the table unless the active MNO instructs it to do so.

The existence of a lock (in TSM1's database) may then prevent handover to TSM2 (who might not be able to or trusted to enforce the lock). This would also be needed as an anti-theft mechanism. Moreover, if the handover to TSM2 is accompanied by a change of MNO (likely) then the handing-over MNO/TSM (TSM1) will need to read the lock table, and should refuse to allow the hand-over until the handing-over MNO has agreed to remove any locks currently in place.

In either of solutions 2 or 3, the locking rules governing which subscriptions can be loaded to the smartcard, additionally or alternatively they can be activated on the smartcard. It is worth noting that conventional SIM-lock only prevents "activation" of a foreign SIM (i.e. using it in the device); it certainly doesn't prevent "loading" of a foreign SIM into the device in the first place.

It is contemplated that there may be switching between "shadow" and "active" subscriptions locally to the device, without explicit TSM involvement. If MNOs need to support such switching in some devices, yet control it via locking rules, solution 3 would be needed. Alternatively solution 2 may be adopted, with the further requirement that the TSM prevents subscriptions co-existing on the smartcard for locked devices, so they can't be swapped locally. However, a solution without shadow subscriptions is not robust (there is no fall-back if a new subscription doesn't work, or is out of coverage). A solution where the switch from "shadow" to "active" requires use of the TSM (but the TSM cannot reach the card because the active subscription doesn't work) is similarly not very robust.

Notice that this is analogous to the physical replacement of a SIM card in a device: the device user can currently do that without needing to contact any remote party, and does not need to be in coverage. Also it could be rather difficult to get the TSM to safely perform the exchange: the customer presumably being prevented from making direct contact, as the TSM does not have a customer care interface, so would have to contact their MNO who contacts the TSM. Clearly there are problems here, since the customer has a choice of MNOs to contact, and would have to authenticate himself to at least one of them (and maybe both) to make the request. Problems will arise if there is an authentication error and a spoof request forwarded on by an MNO. It will be especially difficult if the customer is actually a different person for the two MNOs (e.g. one is a business subscription, one is a personal subscription).

The reader will readily appreciate that effective enforcement may be implemented using a combination of the solutions outlined above. Thus SIM-lock in accordance with the invention may be effected using: a TSM and MNO; the device and eUICC; even MNO+TSM+device+eUICC. Indeed any two or more of these elements may be arranged to cooperate to implement the invention. More generally the device or eUICC may be arranged to store data files including purely advisory information (e.g. to advise the customer and/or TSM/MNO/device/eUICC that a lock is in place) without those files actually being used directly to enforce the lock.

Any combination or permutation of TSM, MNO, device or eUICC may also be arranged to provide the inverse operation—a SIM unlock. Consider for example the following scenarios:

TSM has an expiry date against the SIM-lock in its database; it doesn't enforce the lock past this expiry date.

TSM modifies its own database (by periodic clean-up, or MNO request, or by regulatory request) to remove SIM-locks. These modification requests come in an "online" form (i.e. one per device, in real-time or near real-time), or in a "batch" form (MNO sends a batch of unlocks at the end of a day, or a subscription month).

MNO sends an unlock instruction OTA to the eUICC, and eUICC requests unlocking by the TSM. TSM changes its database entry.

MNO sends an unlock instruction to the device, containing an unlock code, or other signed or authenticated instruction by the MNO. Device asks eUICC to send unlock request to the TSM; eUICC sends request including unlock code or signed instruction; TSM modifies its database accordingly.

MNO provides an unlock code to the user; user provides it to device, and then device provides it to eUICC for forwarding to TSM, as above.

Key elements of a mobile/cellular telecommunications system, and its operation, will now briefly be described with reference to FIG. 1.

Each subscriber to a cellular telecommunications network, such as a GSM or UMTS network, is provided with a UICC/smart card (e.g. SIM, USIM) which, when associated with the user's mobile terminal, identifies the subscriber to the network. The SIM card is pre-programmed with a unique identification number, the "International Mobile Subscriber Identity" (IMSI) which is not visible on the card and is not known to the subscriber, and also a unique key, Ki. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known MSC of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers.

When the subscriber wishes to activate their mobile terminal in a network (so that it may make or receive calls subsequently), the subscriber places their SIM card in a card reader associated with the mobile terminal (terminal 1 in this example). The mobile terminal 1 uses the radio access network to transmit the IMSI (read from the smart card) to the core network of the cellular network operated by the MNO where the IMSI etc are stored.

The HLR 10 causes an authentication procedure to be performed on the mobile terminal 1. The HLR 10 transmits an authentication request comprising the subscriber identity (IMSI) to an AUC (authentication centre) for deriving authentication vectors (AVs). Based on the IMSI, the AUC generates a challenge, which is a random number, or obtains a stored challenge based on the IMSI. Also, the AUC generates an XRES (expected result), based on the challenge and a secret shared with the SIM, or obtains an XRES stored with the challenge. The XRES is used to finalise the authentication.

The authentication data and XRES, are then transmitted in an authentication challenge to the mobile telephone 1. The mobile telephone 1 generates a response by transmitting the authentication data to the SIM of the mobile telephone 1. The SIM generates, based on the Ki of the subscription stored on the SIM and the authentication challenge, a response corresponding to the XRES stored in the server.

For finalising the authentication according to SIM authentication the core network compares the response value with the value of the stored XRES for authentication control.

If the response from the mobile terminal 1 is as expected, the mobile terminal 1 is deemed authenticated.

As part of the authentication process a cipher key Kc for encrypting user and signalling data on the radio path is also established. This procedure is called cipher key setting. The key is computed by the mobile terminal 1 using a one way function under control of the key Ki and is pre-computed for the network by the AuC. Thus at the end of a successful authentication exchange both parties possess a fresh cipher key Kc.

The authentication process will conventionally be repeated while the mobile terminal 1 remains activated and can also be repeated each time the mobile terminal makes or receives a call, if required. Each time the authentication process is performed a new Kc is generated and provided to the terminal 1.

The above mechanism does not permit straightforward replacement of one Ki by another (for another MNO) and therefore suffers from the disadvantages outlined above.

The scheme in accordance with U.S. Pat. No. 9,247,429, combines key derivation and OTA provisioning and is described below. At production, a master secret, K_master, is provisioned on the card. When provisioning a new subscription, a "Trusted Services Manager" (TSM) generates a random or pseudo-random seed (SEED), and transfers it to the card. The SEED is used by the card in the key derivation process.

As the SEED is generated only when needed, the TSM has no knowledge of any Ki that is generated in the future. Also, if the TSM deletes the Ki after sending it to the MNO and to the card, then he keeps no long term knowledge of the K.

While Ki itself is not sent in a secured packet as would be done in an OTA Ki provisioning scheme, this scheme has the same advantages. The derivation value (SEED) being delivered as a secured OTA packet.

Preferably the key derivation is a reversible process (e.g. encrypting the SEED with key K_master), so that it works even if a Ki is provided by MNOs, or if a Ki has been provided to an MNO at an earlier stage and is already loaded in an HLR. The SEED generated by the TSM is thus not a random value: the TSM calculates the value to be sent to the card from the MNO provided Ki by applying the reverse key derivation operation.

A key derivation method is used on the card (UICC) to derive a Ki from a pre-loaded master key "K_master", by sending a data string SEED, such that Ki=KDF(K_master, SEED). However, the derivation function is reversible, such that it is possible to derive any desired target Ki by pre-computing an appropriate SEED. This means any desired target Ki (already ordered and existing in an operator's HLR) can be derived onto any card. It is noted that K_master may be defined as a symmetric key (i.e. the same key shared with other trusted entities) or as an asymmetric key (e.g. private key on eUICC, public key known by TSM or MNO, or by several different TSMs or MNOs).

This solution allows a SIM card (UICC) to be remotely personalized for any operator with any target subscription key (Ki), but without sending an operator "Ki" Over The Air, without storing a Ki in a writable file, and without a huge collection of pre-loaded keys.

In a preferred embodiment, the derivation uses an authenticated encryption algorithm, so that the card can check the integrity of the resulting Ki. For example, we might actually have KDF(K_master, SEED)=Ki∥Hash(Ki) or KDF(K_master, SEED)=Ki∥MAC(Ki) and the card checks the corresponding hash or MAC (Message Authentication Code) function matches the derived hash or MAC, thus ensuring that the Ki is exactly as intended.

Conveniently, any parameters for use of the Ki (e.g an algorithm identifier, operator rotations and constants for MILENAGE) are also integrity-protected along with the Ki itself, so that the Ki cannot be used with an incorrect algorithm (something which would also jeopardize Ki security)

The "SEED" is itself sent to the card protected using an OTA encryption+OTA integrity algorithm, so that the key derivation mechanism is in addition to OTA security, not a replacement for OTA security.

As an additional protection measure, the "SEED" is stored persistently on the card; the Ki is not. Instead, the Ki is re-derived on each start-up, or each usage, of the SIM/USIM authentication algorithm, and the integrity of the Ki is re-checked (so that any attempts at tampering/partial update of the Ki are easily detectable).

In a further aspect of the key switching mechanism described in U.S. Pat. No. 9,247,429, there is advantageously a choice from a (limited) number of pre-loaded "master keys" and associated derivation algorithms, so that different operator Groups are not required to trust each other's keys and algorithms. In addition, there is a choice from a range of trusted parties (basically Trusted Service Managers, TSMs), each of which is able to send a "SEED" to the card OTA.

It is a security requirement that Ki cannot be updated on the UICC in any way except by use of a pre-defined data structure sent OTA along with the SEED; nor can its parameters (OPc, alg_id, r, c) be updated independently of K.

Derivation of Ki

In a preferred embodiment of the key switching mechanism described in U.S. Pat. No. 9,247,429, the mechanism for deriving Ki from SEED should meet the following requirements:

The key derivation is reversible, so that any target Ki can be derived from the pre-loaded master key K_master, by sending a suitably tailored SEED The derivation algorithm provides an integrity check (e.g. via a form of authenticated encryption), so that the card can check the integrity of the resulting Ki The parameters for use of the Ki (e.g algorithm id and rotation and constant parameters) are also integrity-protected along with the Ki itself.

Consider, for example, the string (Ki||CheckSum)) calculated by encrypting SEED with the master key K_master, using AES as cipher:

$$Ki\|CheckSum=E[SEED]_{Kmaster}$$

and the card verifies that CheckSum=SHA-256 (Ki||algorithm_parameters). This scheme allows the TSM to calculate SEED if Ki is given (either if it is provided by the MNO, or already stored in the MNO's HLR, or if a subscription is to be provisioned a second time with the same Ki):

$$SEED=D[Ki\|CheckSum]_{Kmaster}$$

An advantage of such a scheme is that it helps the card meet the above security requirement that Ki and associated algorithm parameters cannot be updated except through the defined data structure. The card does not store Ki in a file, but just stores SEED, and re-computes Ki when needed (e.g. at card start-up, or on each use of the authentication-algorithm). Even if SEED is tampered with, e.g. partially overwritten, in an attempt to discover the Ki value, then the tampering will be detected and the card can refuse to execute the authentication algorithm. The integrity mechanism also ensures that Ki cannot be used with the wrong authentication algorithm, or with incorrect OPc, rotations, constants etc.

Advantageously, two derivation algorithms are incorporated: a main and a back-up. Different master keys will need to be used with different algorithms, so an algorithm identifier (or more explicitly a K_master identifier) is also required when sending SEED. In principle, MNO groups could also specify (proprietary) key derivation algorithms, to be used with specific master keys.

In one embodiment of the invention, the card (e.g. SIM) is associated with (typically embedded within) a machine to machine (M2M) terminal. The term "M2M" has been used to describe applications in such diverse fields as: tracking and tracing; payment; remote maintenance; automotive and electronic toll (e.g. telematics); metering; and consumer devices. The augmentation of M2M to allow wireless communications between devices (often referred to as mobile M2M) makes new services possible in some cases (within the automotive industry, for instance) and in others extends existing M2M services (within the field of smart metering).

With mobile M2M, machines numbering in the order of millions and located anywhere within mobile network coverage, can be simultaneously monitored to provide real-time information that an individual or enterprise can analyze and act upon.

Whether those M2M terminals are mobile or fixed, there are many scenarios where the possibility of secure, authenticated wireless communication with each terminal is seen as beneficial. It certainly allows the M2M devices to become widely distributed without significantly increasing the burden of monitoring the output from the devices.

Clearly physically exchanging smart cards in devices that are widely distributed may present a logistical headache and would be impractical where M2M devices have embedded SIM cards. This embodiment exhibits exactly the potential challenges addressed by the SIM-lock mechanism of the invention.

In the case of M2M applications, the supplier of M2M services, while a distinct entity from the host MNO, may be a trusted party and may wish to effect subscription management (i.e. become a TSM).

In some embodiments of the invention, it may be pragmatic to allow more than one TSM to perform subscription management. Using the key switching mechanism described in U.S. Pat. No. 9,247,429, this will allow there to be a choice from a range of trusted parties (TSMs) each of which can send appropriate SEED values to the card OTA.

Consider the change of TSM from TSM1 to TSM2:

TSM1 provides TSM2 with the data required to perform subscription management (Issuer Security Domain (ISD) or other Trusted Security Domain (TSD), card-ID, keyset, etc.).

TSM2 should then change the key values within the keyset so that only TSM2 is able to manage the subscriptions on the card using that keyset.

The change of TSM may also be associated with a change of MNO: consider for instance a change of subscription (from MNO2 to MNO3) whilst also changing TSM (from TSM1 to TSM2). This change should not be allowed by the incumbent TSM if the card is "locked" to the incumbent MNO (e.g. under contractual terms).

If there are several sequential changes of TSM, there is a risk that key compromise by any TSM in the chain affects the security of all subsequent TSMs' keys, even if the keys are changed by the subsequent TSMs. Hence such compromise also impacts the security of all subsequent MNOs' keys. Advantageously, an approach should be adopted that reduces such a "chain risk", as follows:

TSM1 has keyset 1. To hand-over to TSM2, TSM1 checks that the card is not locked to the current active MNO. If there is no lock, TSM1 creates a new temporary keyset 2, and hands keyset 2 to TSM2. TSM2 replaces temporary keyset 2 by a persistent keyset.

TSM1 promises not to use keyset 1 while TSM2 is the subscription manager; TSM2 promises not to delete keyset 1.

To hand-over to TSM3, TSM1 checks that the card is not locked to the current active MNO. If there is no lock, TSM1 overwrites keyset 2 with a new temporary keyset 2, and hands keyset 2 to TSM3. TSM3 replaces temporary keyset 2 by a persistent keyset.

TSM1 promises not to use keyset 1 while TSM3 is the subscription manager; TSM3 promises not to delete keyset 1 . . .

and so on for future changes of TSM. This solution allows an unlimited number of changes of TSM, but is technically simple as there are never more than two keysets usable for subscription management. The promise of TSM1 ensures that only one keyset is used at a time. A compromise of keys by TSM2 does not affect the security of TSM3's, TSM4's keys etc. and no TSM has to hand over their own keys. No changes are needed in GlobalPlatform. Accredited TSMs would only be obliged to create keysets for other accredited TSMs, so that the promises made between TSMs are reliable.

The check (by TSM) that the card is not locked to the current active MNO is preferably a check of the SIM locking mechanism described above.

If key derivation from a master key K_master is used, in accordance with the invention, then each TSM will need to know a corresponding K_master. Potentially, each TSM could pass the value of K_master to its successor, but this re-creates the risk of sequential compromise described above. Pre-loading K_masters and assigning them to known (accredited) TSMs in an ecosystem, with some reserved for future accredited TSMs is another possible solution. The benefit is that key distribution issues are more manageable since they apply to a few accredited TSMs rather than many MNOs.

The invention claimed is:

1. A method for personalization of a mobile equipment, the mobile equipment having a physically unswappable smart card personalized to a first telecommunications subscription of a first mobile network operator (MNO) to thereby lock the mobile equipment to a telecommunications network of the first MNO, wherein the first telecommunications subscription is available on the smart card and is updateable, the method comprising:
   receiving, at a trusted service manager (TSM), a request to replace the first telecommunications subscription of the first MNO with a second telecommunications subscription of a second MNO;
   accessing, by the TSM, a personalization rule table record corresponding to the smart card to determine whether the personalization rule table record indicates that the requested replacement is forbidden; and
   upon a condition in which the personalization rule table record does not indicate that the requested replacement is forbidden:
      transmitting, from the TSM to the smart card, a seed that is useable by the smart card to generate a cipher key for encrypting user data and signaling data;
      receiving, at the TSM, a unique network authentication key for the second MNO that is derived from both a pre-loaded master key stored on the smart card and the seed transmitted from the TSM; and
      facilitating, by the TSM, a logical swap to the second telecommunications subscription by using the derived unique network authentication key for the second MNO to personalize the smart card of the mobile equipment to the second telecommunications subscription, the second telecommunications subscription locking the mobile equipment to a telecommunications network of the second MNO.

2. A method as claimed in claim 1, wherein the smart card includes the personalization rule table record.

3. A method as claimed in claim 1, wherein the TSM includes the personalization rule table record.

4. A method as claimed in claim 1, wherein the mobile equipment includes the personalization rule table record.

5. A method as claimed in claim 1, wherein the first telecommunications subscription is updateable by the TSM.

6. A method as claimed in claim 5, wherein the personalization rule table record indicates that the requested replacement is forbidden when the second telecommunications subscription is not preloaded on the smart card.

7. A method as claimed in claim 1, wherein the TSM establishes an initial personalization rule table record on behalf of an active MNO, and wherein the TSM enables the active MNO to further personalize the mobile equipment independently of the TSM.

8. A method as claimed in claim 7, wherein the TSM authorizes a keyset of the active MNO to perform further personalization of the mobile equipment.

9. A method as claimed in claim 7, wherein the TSM further provides a form of unlock code to the active MNO to further personalize the mobile equipment, the unlock code being deliverable by the active MNO to the mobile equipment or to a user of the mobile equipment.

10. A method as claimed in claim 1, wherein the mobile equipment is locked to the first telecommunications subscription, and wherein the first telecommunications subscription is barred by the first MNO thereby making the mobile equipment unusable with any telecommunications subscription.

11. A method as claimed in claim 10, wherein the mobile equipment is pro-actively locked to the first telecommunications subscription or to a subscription range of the active first MNO prior to any reported theft.

12. A method as claimed in claim 10, wherein the locking and/or barring is made temporary while a status of a reported theft is investigated.

13. A method as claimed in claim 1, wherein the mobile equipment is locked to the first telecommunications subscription by marking a corresponding personalization rule table record as "do not deactivate/do not delete".

14. A method as claimed in claim 1, wherein the personalization rule table record corresponding to the smart card is delivered to the mobile equipment Over The Air.

15. A method as claimed in claim 1, the method further including:
   receiving, at the TSM, a request to replace an "active" telecommunications subscription with a "dormant" telecommunications subscription.

16. A method as claimed in claim 1, wherein changing from the first telecommunications subscription to the second telecommunications subscription is temporary until the change is successfully reported to, and explicitly confirmed by, a server managed by a particular TSM of the first MNO, the change being reverted in case of failure to confirm.

17. A system for personalization of a mobile equipment, the mobile equipment having a physically unswappable smart card personalized to a first telecommunications subscription of a first mobile network operator (MNO) to thereby lock the mobile equipment to a telecommunications network of the first MNO, wherein the first telecommunications subscription is available on the smart card and is updateable, and wherein the system performs at least the following:
   receive, at a trusted service manager (TSM), a request to replace the first telecommunications subscription of the first MNO with a second telecommunications subscription of a second MNO;
   access, by the TSM, a personalization rule table record corresponding to the smart card to determine whether the personalization rule table record indicates that the requested replacement is forbidden; and
   upon a condition in which the personalization rule table record does not indicate that the requested replacement is forbidden:

transmit, from the TSM to the smart card, a SEED that is useable by the smart card to generate a cipher key for encrypting user data and signaling data;

receive, at the TSM, a unique network authentication key for the second MNO that is derived from both a pre-loaded master key stored on the smart card and the SEED; and facilitate, by the TSM, a logical swap to the second telecommunications subscription by using the derived unique network authentication key for the second MNO to personalize the smart card to the second telecommunications subscription.

18. A system as claimed in claim 17, wherein the smart card includes the personalization rule table record.

19. A system as claimed in claim 17, wherein the TSM includes the personalization rule table record.

20. A system as claimed in claim 17, wherein the mobile equipment includes the personalization rule table record.

* * * * *